US007760085B2

(12) United States Patent
Lertora et al.

(10) Patent No.: US 7,760,085 B2
(45) Date of Patent: Jul. 20, 2010

(54) MONITORING APPARATUS FOR TANKS AND THE LIKE

(75) Inventors: Francesco Lertora, Chiavari (IT); Daniele Grosso, Genoa (IT); Giuseppe Oriana, Genoa (IT); Luca Noli, Genoa (IT)

(73) Assignee: Montalbano Technology S.p.A., Pistoia (PT) (IT)

( * ) Notice: Subject to any disclaimer, the term of this patent is extended or adjusted under 35 U.S.C. 154(b) by 211 days.

(21) Appl. No.: 11/938,315

(22) Filed: Nov. 12, 2007

(65) Prior Publication Data
US 2008/0110255 A1 May 15, 2008

(30) Foreign Application Priority Data
Nov. 10, 2006 (IT) .......................... GE2006A0105
Feb. 28, 2007 (IT) .......................... GE2007A0022

(51) Int. Cl.
*G08B 1/08* (2006.01)
(52) U.S. Cl. ................................. 340/539.31
(58) Field of Classification Search ............ 73/291; 340/539.31
See application file for complete search history.

(56) References Cited

U.S. PATENT DOCUMENTS

| 4,487,065 | A  | * | 12/1984 | Carlin et al. ............... 73/290 V |
| 6,919,803 | B2 | * | 7/2005  | Breed .................... 340/539.14 |
| 2003/0196798 | A1 | * | 10/2003 | Newman ................ 166/250.01 |
| 2005/0056090 | A1 | * | 3/2005  | McSheffrey et al. .......... 73/291 |
| 2006/0037959 | A1 | * | 2/2006  | Hokazono et al. ............ 220/303 |
| 2007/0137730 | A1 |   | 6/2007  | DeCapua et al. |

FOREIGN PATENT DOCUMENTS

| DE | 198 07 452 A1 | 8/1999 |
| WO | 2007/093714 A2 | 8/2007 |

* cited by examiner

*Primary Examiner*—Hezron Williams
*Assistant Examiner*—Nathaniel Kolb
(74) *Attorney, Agent, or Firm*—Matthias Scholl, PC; Matthias Scholl

(57) ABSTRACT

A monitoring apparatus for tanks and the like, comprising detecting means (4; 506) to detect the filling level of a tank, detecting means (5, 106; 206) to detect the opened and closed states of opening/closing means (6) of said tank, and gathering and processing means (106) to gather and process the detected data, characterized in that said processing means (106) are integrated with an RFID unit (116) which can communicate said data with at least one appropriate remote transceiver unit (7).

8 Claims, 3 Drawing Sheets

MONITORING APPARATUS FOR TANKS AND THE LIKE

CROSS-REFERENCE TO RELATED APPLICATIONS

This application claims priority to Italian Patent Application No. GE2006A000105, filed Nov. 10, 2006, and to Italian Patent Application No. GE2007A000022, filed Feb. 28, 2007, the contents of both of which, including any intervening amendments to these applications, are incorporated herein by reference.

BACKGROUND OF THE INVENTION

1. Field of the Invention

The present invention relates to a monitoring apparatus for tanks and the like, and particularly it relates to an apparatus for monitoring tanks of motor vehicles.

2. Description of the Prior Art

The control of the quantity of fluid contained in a tank and of the modes of charge and discharge thereof is of noticeable importance, especially in the transport field. More typically, a careful control of the fuel consumption is a key factor in the cost control, and it is hence important to avoid that the fuel can be stolen. One of the main problems is due to the fact that the control of accesses to the tanks should be carried out independently of the driver, who may often be responsible, or at least partially responsible, for the fuel thefts performed to the detriment of the transport company. Therefore, it is not sufficient to just connect the means of access to the tank, i.e. the filler cap, to the vehicle's anti-theft device, as this device may still be switched off; more specifically there is a need for a filler cap provided with a device capable of signalling its state.

Systems which sense the presence or absence of a filler cap on the mouthpiece of a vehicle tank are already known in the art, for example from EP-B1-1052131; however, these systems are structured in such a way as to signal the opening state of the filler cap only to the interior of the vehicle, and furthermore there is currently no way of establishing when the opening took place and how long it lasted. During the research that led to the present invention, we have considered devices comprising an integrated microcontroller provided with an RFID interface and a non-volatile memory, which can be conveniently adapted according to the aforementioned requirements, so that information relative to the filler cap state can be both stored and transmitted.

Moreover, it would be useful, for a much more complete analysis of the history of the fluid contained in a tank, to have the possibility of monitoring also the actual content of the tank.

SUMMARY OF THE INVENTION

Therefore, an aim of the present invention is to provide an apparatus comprising means capable of sensing the time of removal of the filler cap and the duration of such removal.

Another aim of the present invention is an apparatus capable of monitoring tanks and the like, in which it is possible obtain information regarding both the opened or closed state of the filler cap and the filling state of the tank, with an opportune correlation.

Accordingly, the object of the present invention is a monitoring apparatus for tanks and the like, comprising detecting means to detect the opened and closed states of opening/closing means of said tank, and gathering and processing means to gather and process the detected data, characterized in that said processing means are integrated with a radio frequency identification unit which can communicate said data with at least one suitable remote transceiver unit.

Another object of the present invention is an apparatus as above described, in which are also provided means to detect the filling level of a tank, cooperating with the said gathering and processing means.

In a first embodiment, said tank is provided with a filler cap having means to detect its opened/closed state with respect to the mouthpiece of said tank, said filler cap being provided with a data processing unit integrated with a radio frequency identification unit, said filler cap being further provided with means to detect the level of fluid in the tank, said data processing unit being able to collect a set of data regarding the opened/closed state of the filler cap, the opening/closing event of the filler cap and the level of fluid in the tank, such set of data being available to a remote receiver. The data processing unit is provided with a powering circuit.

Preferably, said filler cap comprises two portions which are coupled to each other and can be in relative motion with each other, said relative motion being associated with the opened or closed state of said filler cap. Specifically, one of the said portions is provided with a permanent magnet, said sensing means comprising a Hall effect sensor.

Alternatively, said portions are coupled to switching means which can switch on or switch off a circuit component of the powering circuit of said data processing unit, said circuit component being adapted to modify the electrical features of the power supply for said data processing unit.

In another embodiment, the data processing unit is arranged in the filler cap and communicates with the detecting means for the opened/closed state of the filler cap, which detecting means are also located in the filler cap, while the detecting means for the level of fluid in the tank are arranged inside the tank itself and communicate with said data processing unit through appropriate transmission means. In the specific case of a vehicle tank, the detecting means for the level of fluid in the tank are interfaced to the central processing unit of the vehicle itself, and the CAN/LIN (Controller Area Network/Local Interconnect Network) network of the vehicle, which connects the various devices to the central processing unit, comprises an RFID (Radio Frequency IDentification) type transceiver unit capable of communicating with the RFID unit integrated into the data processing means.

In this case, according to the selected embodiment, the central processing unit can control the data gathering process of the apparatus and, in the same time, it can generate a table containing data about the state of the filler cap and the fuel level of the tank within its processing unit, so as to send them to the filler cap once they have been registered, or it can simply supply the cap with periodical updates about the fuel level in the tank, leaving the data correlation to the processing unit of the filler cap.

In a further embodiment, the detecting means for the state of the opening/closing means of the tank can be arranged outside the filler cap. In particular, if the filler cap if provided with a processing unit integrated with a Radio Frequency IDentification unit, this RFID unit can be in communication with another RFID unit, like the unit mentioned in the above-described embodiment, and hence the displacement between the two units can be interpreted by the logic of the apparatus as an opening event of the cap itself. The resulting data can then be correlated with the data about the fluid level in the tank in a similar fashion as before.

BRIEF DESCRIPTION OF THE DRAWINGS

Other advantages and features of the apparatus according to the present invention will be apparent from the following description of certain embodiments thereof, which are provided by way of illustration, and not by way of limitation, with reference to the accompanying drawings, wherein.

DESCRIPTION OF THE PREFERRED EMBODIMENTS

Figure 1:
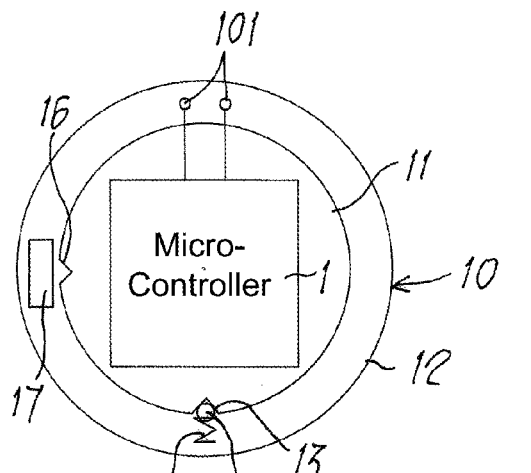
FIG. 1 is a schematic diagram depicting the filler cap according to the present invention in a closed state.
Figure 2:
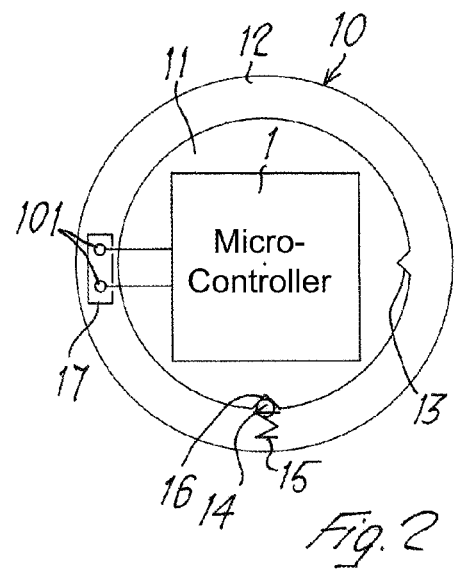
FIG. 2 is a view similar to that of FIG. 1, but with the filler cap in an opened state.

FIG. 1 is a schematic plant view of a filler cap, designated with the reference numeral 10; reference numeral 1 denotes a micro-controller, that is to say the gathering and processing means according to the present invention, which is arranged in an innermost portion 11 of the filler cap 10. This portion 11 is relatively free to move with respect to an outermost portion 12 of the filler cap 10. The microcontroller 1 is provided with two contacts 101, externally projecting from the portion 11 and cooperating, as shown in FIG. 2, with a metal plate 17 which is arranged on the portion 12 of the filler cap 10. Furthermore, the portion 11 has two cavities 13 and 16 arranged at a given angle to each other; as can be noted, in the condition shown in FIG. 1, which corresponds to the closed state of the cap 10 on the tank (not shown), the cavity 13 is occupied by a sphere 14 projecting from the portion 12 due to a spring 15.

In FIG. 2, in which like reference numerals refer to like elements, it can be viewed how a rotation imparted to the filler cap to open it results in a relative rotation between the portions 11 and 12, so that the contacts 101 are now cooperating with the metal plate 17 and the sphere 14 is now located in the cavity 16.

Figure 3:
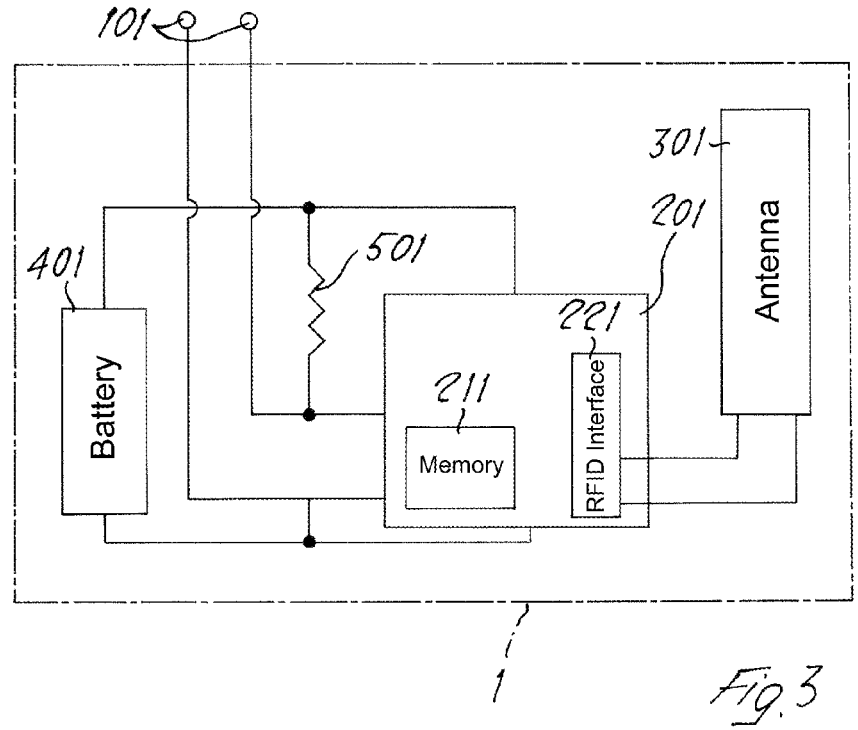
FIG. 3 is a schematic block diagram showing the gathering and processing means included in the filler cap of the invention.

FIG. 3 shows schematically the microcontroller 1; as can be noted, in addition to the above described contacts 101, it comprises a processor 201 which incorporates a memory unit 211 and an interface RFID 221, connected to an antenna 301. The processor 201 is powered by a battery 401, which is also connected to a resistor 501; the contacts 101 are inserted in the circuit branch where the resistor 501 is located.

Figure 4:
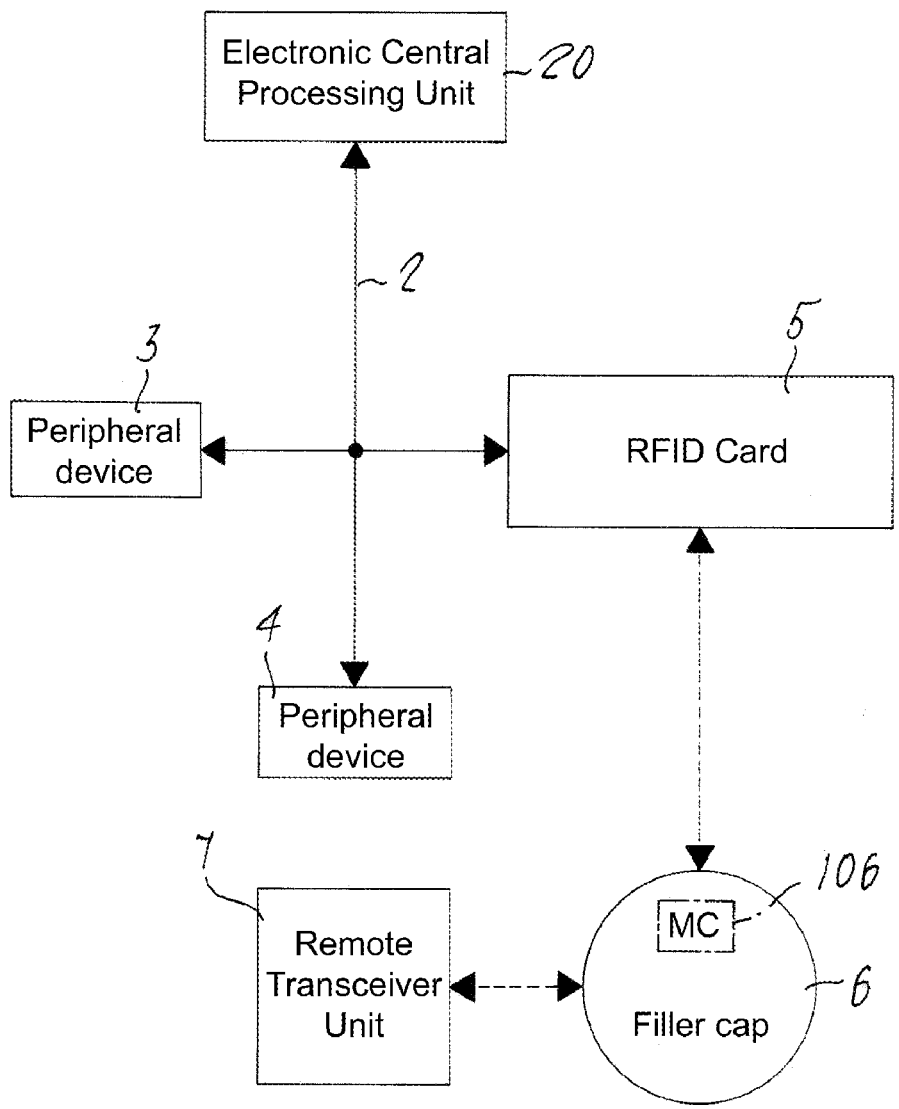
FIG. 4 is a schematic block diagram showing an embodiment of the apparatus according to the present invention.
Figure 5:
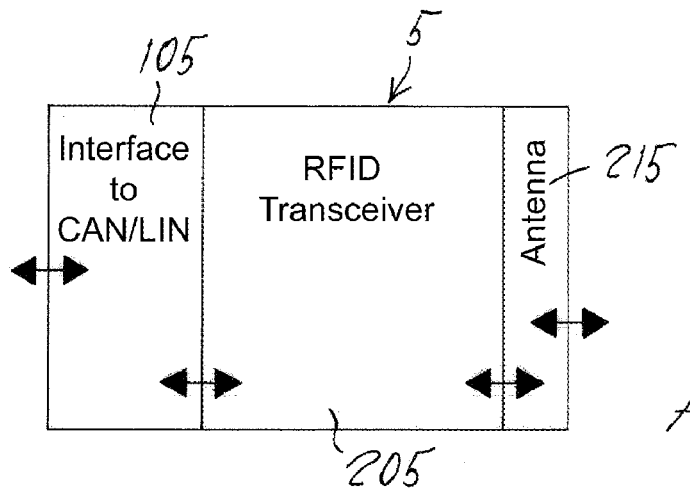
FIG. 5 is a schematic diagram showing the logic of a device of the apparatus according to the invention.

FIG. 4 shows a diagram illustrating a further embodiment of the apparatus according to the present invention; in this embodiment, the apparatus is applied to motor vehicles and their tanks. Reference numeral 20 designates the electronic central processing unit of the motor vehicle, which unit is connected, through a CAN/LIN network 2, to peripheral devices 3 and 4 which detect specific data of the vehicle; in particular, the peripheral device 4 can be a fuel level sensor located in the tank of the motor vehicle. Also connected to the network 2 is an RFID card 5, the logical scheme thereof being shown in FIG. 5, which can communicate with an RFID unit integrated in a microcontroller 106 of a filler cap 6. A remote transceiver unit 7 is in turn capable of communicating with the RFID unit of the filler cap 6. As shown in FIG. 5, the RFID card 5 includes an interface 105 to the CAN/LIN network, an RFID transceiver 205, and an antenna 215.

Figure 6:
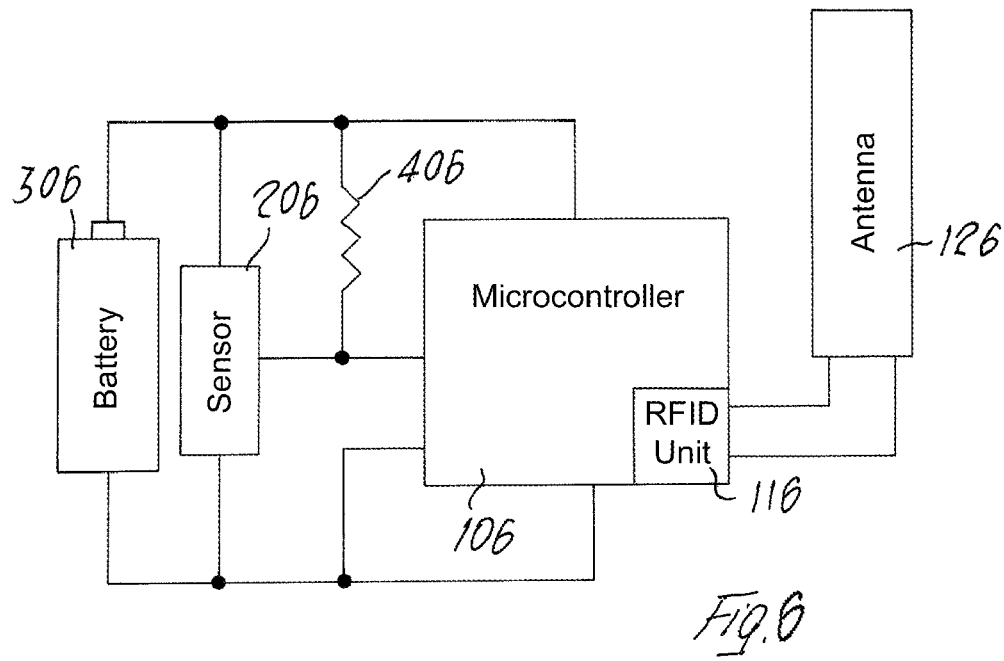
FIG. 6 is a schematic diagram showing a first alternative embodiment of a device of the apparatus according to the invention.

FIG. 6 shows a first alternative embodiment of the device incorporated in the filler cap 6. The microcontroller 106, provided with an integrated RFID unit 116 and connected to an antenna 126, is powered by a battery 306. The microcontroller 106 is also connected to a sensor 206, such as a Hall sensor, to sense the state of the filler cap, so as to detect the displacement of a permanent magnet in the movable portion of the filler cap, and hence to communicate the opening/closing event to the microcontroller 106. The circuit also includes a resistor 406.

Figure 7:
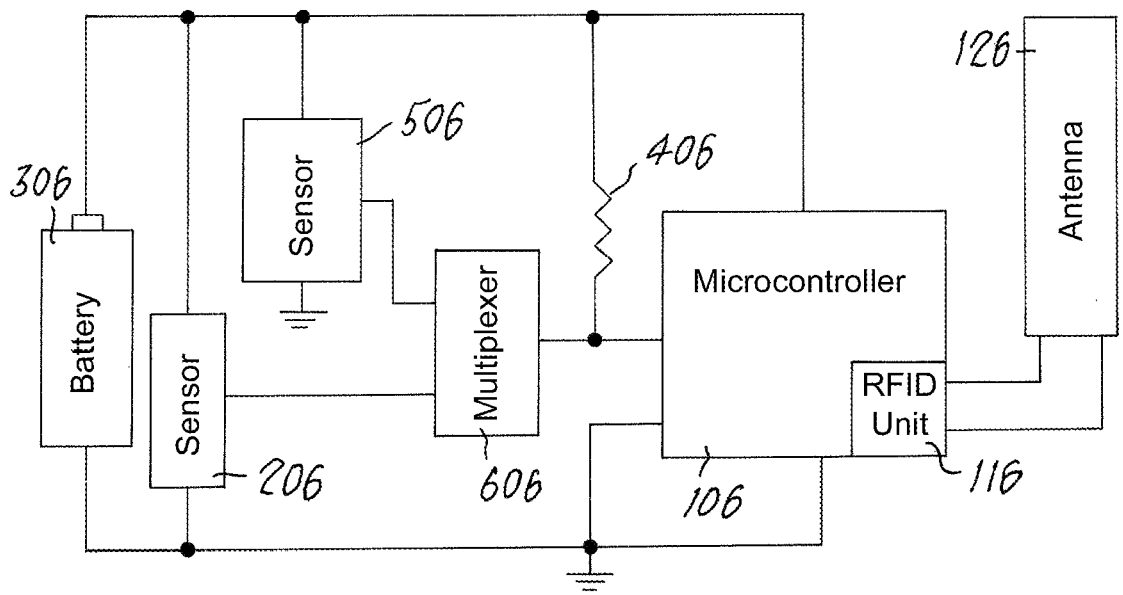
FIG. 7 is a schematic diagram showing a second alternative embodiment of a device of the apparatus according to the invention.

The circuit in FIG. 7 represents another alternative embodiment of the device incorporated in the filler cap 6; like reference numerals refer to like elements. In this embodiment, the filler cap 6 comprises, along with the sensor 206, a sensor 506 capable of sensing the fluid level in the tank; the two sensors are coupled to the microcontroller 106 through a multiplexer 606.

The operation of the apparatus according the present invention will be clear from the following. When the filler cap is on the tank mouthpiece, the portions 11 and 12 are relatively positioned to each other as shown in FIG. 1; in this way, as shown in FIG. 3, the power supplied to the processor 201 by the battery will have the highest current intensity. On the contrary, when the filler cap is opened and the relative position of the portions 11 and 12 of the filler cap 10 is as shown in FIG. 2, with the contacts 101 connected to each other by the metal plate 17, there will be a noticeable change in the current intensity and/or tension detected by the processor 201, and the processor 201 will initiate a procedure of storage of the opening event, which procedure will finish only when the cap 10 is again positioned according to the configuration depicted in FIG. 1. The stored data, which report the date, time and duration of the opening, can then easily be read by an external reader cooperating with the RFID unit of the microcontroller, through the antenna 301.

Advantageously, blocking means, such as the cavities 13 and 16 and the sphere 14 loaded by the spring 15, are provided in order to avoid accidental relative displacements of the portions 11 and 12 of the filler cap 10. It is obvious that the microcontroller is capable of working together with an RFID system arranged in the interior of the vehicle.

In the embodiment illustrated in FIGS. 4 to 7, the apparatus is capable of gathering all the information about the opened/closed state of the filler cap of a tank and about the quantity of fluid contained in the tank, simply through a RFID card which is suitably interfaced to the detection means of the fluid quantity in the tank, and which is capable of communicating with the RFID unit integrated in the cap. Based on the relative displacement between the two RFID units, the apparatus can detect the opening and closing of the filler cap and combine both data in the processing unit of the microcontroller arranged in the filler cap in order to obtain a comprehensive database.

Of course, when the subject tank is that of a motor vehicle, it is clear that the apparatus can rely on a previously existing data transmission network, i.e. the CAN/LIN network 2, which transfers information from the various peripheral devices of the vehicle to the central processing unit 20; in order to allow a continuous implementation, this network can include a series of accessible nodes in which the RFID card 5 can be inserted in a parallel fashion. The card 5 can then easily acquire data about the state of the tank, and hence various operative solutions can be configured.

The first is the one aforementioned: the central processing unit 20 interrogates the filler cap 6 and establishes if the filler cap is closed or opened based on whether the microcontroller RFID 106 arranged in the filler cap responds to the RFID card 5 of the network. If the filler cap 6 is closed and near the card 5, it can answer to the transceiver, which will understand that the filler cap is closed and in place; if the filler cap is opened and far from the card, it cannot answer to the transceiver, which will understand that the filler cap 6 is opened and not in place. This information can be easily correlated with the information on the fuel level, already present in the central processing unit 20 itself, and can then be collected together with the information on the filler cap 6 either in the central processing unit 20 or in the microcontroller 106 located in the filler cap 6, from which it can be transmitted to the remote transceiver 7.

In another alternative embodiment, as shown in FIG. 7, the filler cap contains, along with the sensor 206 to detect the (opened/closed) state of the filler cap, a sensor 506 to detect the fuel level in the tank. Such sensor is connected to the same analog interface of the microcontroller 106 through the multiplexer 606, which allows selecting one of the sensors at a time. Now the filler cap can store a table containing the following information: "Cap Open/Closed-Event Date-Fuel Level" and can be read by an external transceiver (gateway, hand-held device, etc . . . ) or communicate with the central processing unit through a transceiver (RFID card) inside the vehicle and connected to the CAN/LIN network of the vehicle itself.

In the other alternative embodiment, as shown in FIG. 6, the filler cap 6 is provided with the sensor 206, but not with a sensor for the fuel level; in this case, the apparatus can operate according to different modes. In the first mode, the cap contains the table: "Cap Open/Closed-Event Date," and the fuel level is transmitted from the central processing unit 20 which interrogates the filler cap through the RFID card 5. The central processing unit 20 interrogates the filler cap 6 on a cyclic basis; when the filler cap shows a state transition, e.g. from a closed state to an opened state, the central processing unit stores a table containing the following information: "Cap Open-Event Date-Fuel Level" in its internal memory by reading the portion "Cap Open-Event Date" from the cap and the portion "Fuel Level" from the CAN/LIN network. The central processing unit 20 continues to interrogate the filler cap 6; when the cap signals the closing event, the central processing unit stores a table containing the following information: "Cap Closed-Event Date-Fuel Level" by obtaining the information in a similar fashion to the "Opening" event. Also in this alternative embodiment, of course, the filler cap can communicate with the remote transceiver 7 through the RFID unit 116.

In the second case, the data collection, i.e. the data table, is contained in the microcontroller 106 of the cap 6 and not in the logical scheme of the central processing unit 20. The operation is substantially the same as in the previous case; the central processing unit 1 writes the information "Fuel Level" in the memory of the cap and correlates it to the information "Cap Open-Event Date". A third possibility involves that the data collection is stored both in the memory of the central processing unit and in the memory of the microcontroller of the filler cap.

It is absolutely clear that the different potential uses of the apparatus according to the present invention can be perfectly suited to different needs; indeed, the apparatus can be used in such a way that the driver of the vehicle provided with the apparatus cannot view the data, which can be only retrieved through a remote RFID unit, or the apparatus can be fully integrated into the controls available as on-board instrumentation.

The apparatus according to the present invention offers a wide range of potential applications which are not merely limited to motor vehicles, as it can be adapted, through modifications that do not alter its core characteristics, to almost every fluid container that requires a constant control over its content.

The invention claimed is:

1. A monitoring apparatus for a tank or the like, comprising detecting means (5, 106; 206; 17, 101) to detect the opened and closed states of opening/closing means (10; 6) of said tank, and gathering and processing means (1; 106) to gather and process the detected data, wherein said gathering and processing means (106; 1) are integrated with an RFID unit (116; 221) which communicates said data with at least one suitable remote transceiver unit (7);

said detecting means for the state of said opening/closing means (6) of said tank comprise sensing means (206; 17, 101) which are positioned on said opening/closing means (6; 10), the said processing means (106) being arranged in said opening/closing means (6; 10) of said tank, and provided with powering means (401; 306);

said opening/closing means comprise a filler cap (6; 10) comprising two portions (11, 12) which are coupled to each other and can be in relative motion with each other, said relative motion being associated with the opened or closed state of said filler cap;

said gathering and processing means (1; 106) is positioned within one of said portions (11, 12) of said filler cap (10);

said portions (11, 12) are coupled to switching means (101, 17) which can switch on or switch off a circuit component of the powering circuit (401) of said processing means (1), said circuit component being adapted to modify the electrical features of the power supply for said processing means (1); and said switching means comprise two contacts (101) which are arranged on one of said portions (11), said contacts cooperating with a metal plate (17) which is arranged on the other portion (12).

2. The apparatus of claim 1, wherein one of the said portions is provided with a permanent magnet, and said sensing means comprises a Hall effect sensor (206).

3. The apparatus of claim 1, wherein said portions (11, 12) of said filler cap (10) are provided with blocking means (13, 16, 14, 15) to block said relative motion, said blocking means (13, 16, 14, 15) being arranged to securely and detachably block said portions (11, 12) in positions which correspond to the opened and closed states of said filler cap (10), respectively.

4. The apparatus of claim 1, wherein said detecting means for the state of said opening/closing means comprise an RFID unit (5) which is arranged near said tank and which communicates with said RFID unit (116), said RFID unit (116) being integrated into said processing means (106), the said processing means (106) being arranged in said opening/closing means (6) of said tank, and provided with powering means (306).

5. A monitoring apparatus for a tank or the like, comprising
    detecting means (5, 106; 206; 17, 101) to detect the opened and closed states of opening/closing means (10; 6) of said tank,
    detecting means (4; 506) for the filling level of the tank; and
    gathering and processing means (1; 106) to gather and process the detected data,
wherein
    said gathering and processing means (106; 1) are integrated with an RFID unit (116; 221) which communicates said data with at least one suitable remote transceiver unit (7);and
    said tank is a fuel tank of a motor vehicle, said motor vehicle being provided with an electronic control unit (20) in communication with suitable peripheral devices (3, 4) through a suitable CAN/LIN network (2), an RFID card (5) being provided with an interface (105) to said network, said interface being able to communicate with said RFID unit (116) integrated into said processing means (106).

6. The apparatus of claim 5, wherein said detecting means for the filling level of the tank comprise means (4) which is positioned inside the tank itself and communicates with said RFID unit (116) integrated into said processing means (106) through an RFID unit (5) which is connected to said means (4).

7. The apparatus of claim 5, wherein said detecting means for the filling level of the tank comprises sensing means (506) arranged in said opening/closing means of the tank, said sensing means being connected to said processing means (106).

8. The apparatus of claim 7, wherein said sensing means (506) to sense the filling level and said sensing means (206) to sense the state of said opening/closing means are connected to said processing means (106) through a multiplexer (606).

* * * * *